US012389872B2

(12) United States Patent
Huang

(10) Patent No.: US 12,389,872 B2
(45) Date of Patent: Aug. 19, 2025

(54) PET LITTER ENCLOSURE WITH ROLLING INTERNAL COMPARTMENT

(71) Applicant: Pinta International, Hayward, CA (US)

(72) Inventor: Shi Biao Huang, Shantou (CN)

(73) Assignee: Pinta International, Hayward, CA (US)

( * ) Notice: Subject to any disclaimer, the term of this patent is extended or adjusted under 35 U.S.C. 154(b) by 111 days.

(21) Appl. No.: 18/411,419

(22) Filed: Jan. 12, 2024

(65) Prior Publication Data
US 2025/0228206 A1     Jul. 17, 2025

(51) Int. Cl.
*A01K 1/01*     (2006.01)

(52) U.S. Cl.
CPC .................. *A01K 1/0107* (2013.01)

(58) Field of Classification Search
CPC .... A01K 1/0107; A01K 1/011; A01K 1/0114; A01K 1/033; A01K 1/034; A01K 1/035; A01K 1/0245; A01K 1/0035
See application file for complete search history.

(56) References Cited

U.S. PATENT DOCUMENTS

| | | | | |
|---|---|---|---|---|
| 1,345,968 A * | 7/1920 | Speicher | ................. | A01K 31/22 119/487 |
| 3,618,568 A * | 11/1971 | Breeden | ................. | A01K 1/033 119/482 |
| 5,054,426 A * | 10/1991 | Panarelli | ............... | A01K 1/0245 119/473 |
| 5,184,568 A * | 2/1993 | Healey | ................. | A01K 15/024 119/482 |
| 5,335,618 A * | 8/1994 | Zarola | ...................... | A01K 1/00 119/497 |
| 5,671,697 A * | 9/1997 | Rutman | ................. | A01K 15/02 119/472 |
| 6,109,211 A * | 8/2000 | Tomlinson | ........... | A01K 1/0107 119/165 |
| 6,367,420 B1 * | 4/2002 | Tomlinson | ........... | A01K 1/0107 119/165 |
| 7,487,744 B1 * | 2/2009 | Goldberg | ............... | A01K 31/07 119/482 |
| D650,953 S * | 12/2011 | Lee | .............................. | D30/161 |
| 9,504,230 B1 * | 11/2016 | Schillero, Jr. | ........ | A01K 1/0236 |
| 10,136,613 B2 * | 11/2018 | Sprague | ............... | A01K 1/0107 |
| 11,026,396 B2 * | 6/2021 | Akers, II | ............. | A01K 1/0107 |
| 12,185,692 B2 * | 1/2025 | Kim | ..................... | A01K 1/0107 |
| 12,193,406 B2 * | 1/2025 | Kirkpatrick | .......... | A01K 1/0107 |
| 2007/0000448 A1 * | 1/2007 | Dietz | ..................... | A01K 1/033 119/481 |
| 2010/0282179 A1 * | 11/2010 | Ho | .......................... | A01K 1/03 119/455 |
| 2013/0160381 A1 * | 6/2013 | Sommer | ............. | A01K 1/0107 52/173.1 |

(Continued)

*Primary Examiner* — Eret C McNichols
(74) *Attorney, Agent, or Firm* — Brian Trotter

(57) ABSTRACT

The present invention comprises a pet litter enclosure including an enclosure box and a rolling internal compartment. The rolling internal compartment may include an opening, and the rolling internal compartment may roll inside the enclosure box. In operation, a litter box may be placed within the rolling internal compartment and may be rolled away from the enclosure box for cleaning and refilling purposes.

9 Claims, 5 Drawing Sheets

(56) References Cited

U.S. PATENT DOCUMENTS

| | | | |
|---|---|---|---|
| 2016/0066535 A1* | 3/2016 | Anderson | A01K 1/0245 |
| | | | 119/473 |
| 2016/0302379 A1* | 10/2016 | Sprague | A01K 1/0107 |
| 2022/0279749 A1* | 9/2022 | Leiker | A01K 1/0107 |
| 2022/0361439 A1* | 11/2022 | Leiker | A01K 1/0107 |
| 2024/0260534 A1* | 8/2024 | Carmody, III | A01K 1/0107 |

* cited by examiner

PET LITTER ENCLOSURE WITH ROLLING INTERNAL COMPARTMENT

FIELD OF THE INVENTION

The present invention relates to a pet litter enclosure, more specifically to a pet litter enclosure with a rolling internal compartment.

BACKGROUND OF THE INVENTION

Pet litter disposal is a constant hassle for pet owners. Owners must find an inconspicuous location for a litter box and must constantly be disposing of litter and refilling a litter box. The process of disposing of litter is messy and can lead to frequent spills.

Some solutions exist which may hide a litter box within a small article of furniture, but these may require an owner to reach into a relatively small location to remove a litter box, and the litter box must still be carried some distance to be disposed. Spills may still occur with these solutions.

There is a need for a pet litter enclosure which hides the litter box within the enclosure, and allows for the litter box to be moved away from the enclosure for safe and fast disposal.

SUMMARY OF THE INVENTION

In one of various examples, a pet litter enclosure may include an enclosure box and a rolling internal compartment. The enclosure box may include a left-side panel, a rear panel, a right-side panel and a top panel. The left-side panel may be coupled to the top panel and the rear panel and the right-side panel may be coupled to the top panel and the rear panel. The rolling internal compartment may include a left-side panel, a right-side panel, a rear panel, a bottom panel, a front panel and a plurality of wheels coupled to one or more of the left-side panel, right-side panel, rear panel and front panel. In addition, the left-side panel may be coupled to the bottom panel, the rear panel and the front panel, the right-side panel may be coupled to the bottom panel, the rear panel and the front panel, the bottom panel may be coupled to the rear panel and the front panel. The front panel may include an opening, and the rolling internal compartment may roll and may fit inside the enclosure box.

DETAILED DESCRIPTION

Figure 1:
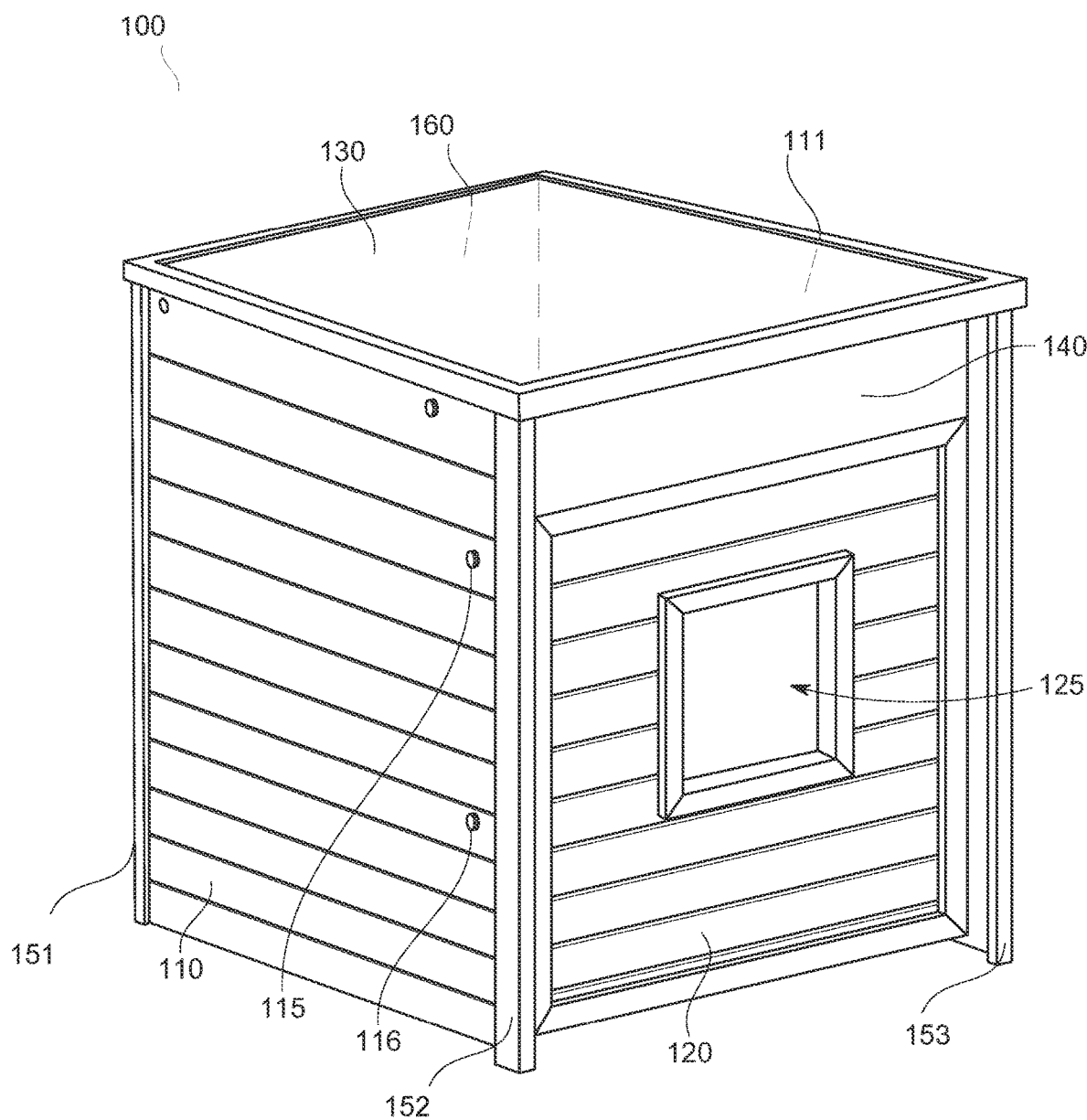
FIG. 1 is a perspective view of one embodiment of the pet litter enclosure in a closed position.

The following description includes specific details to provide an understanding of the present invention. Embodiments of the present invention described in the following description may be incorporated into other devices not disclosed in the following description. Structures and elements shown in the drawings are exemplary embodiments of the present invention and are not to be used to limit broader teachings of the present invention.

It is understood through the text of this disclosure that where elements are described as separate functional units, those skilled in the art will recognize that various elements or portions thereof may be integrated together. Where elements are described in the following description as integrated together into a combined element, those skilled in the art will similarly recognize that individual elements of the combination may be utilized as separate elements.

This specification includes references to "an embodiment of the present invention" or "one embodiment of the present invention". This language is intended to refer to the particular elements and structures of the embodiment being discussed in that portion of the specification. Where references are made to "an embodiment of the present invention" or "one embodiment of the present invention" in other portions of the specification, those similarly refer to those particular elements and structures of the embodiment being discussed in that portion of the specification. Embodiments discussed in different portions of the specification may or may not refer to the same embodiment of the present invention.

The use of specific terminology in the specification is used for best describing the present invention and shall not be construed as limiting. The terms "include", "including", "comprise" and "comprising" shall be understood to be open terminology and not limiting the listed items.

FIG. 1 illustrates one embodiment of a pet litter enclosure 100 in a closed position. The pet litter enclosure may be comprised of an enclosure box and a rolling internal compartment.

The enclosure box may include a top panel 130, a left-side panel 110, a right-side panel 111 and a rear panel 160 . . . . For the purposes of this disclosure, directions are defined in reference to a viewer facing front panel 120, such that panel 110 may be termed a left-side panel. Fasteners 115 and 116 may attach to internal support structures (not shown) on the inside of the enclosure box. Other fasteners may be included which are not specifically mentioned or illustrated.

The enclosure box includes a rear panel not shown in this view of the pet litter enclosure.

The rolling internal compartment may include a front panel 120. An opening 125 may be included in front panel 120. Opening 125 is illustrated in FIG. 1 as a square opening, but this is not intended to be limiting. Opening 125 may be a rectangular shape, a circular shape, or another shape not specifically mentioned.

In operation, opening 125 may provide a path for a pet to access the inside of the rolling internal compartment.

The height of front panel 120 may be less than the height of top panel 130, such that stop panel 140 may fit at the top of front panel 120.

Support structure 151 may support top panel 130 and may couple left-side panel 110 to rear panel 160. Support structure 152 may support top panel 130 and may couple left-side panel 110 to stop panel 140. Support structure 153 may support top panel 130 may couple right-side panel 111 to stop panel 140.

Figure 2:
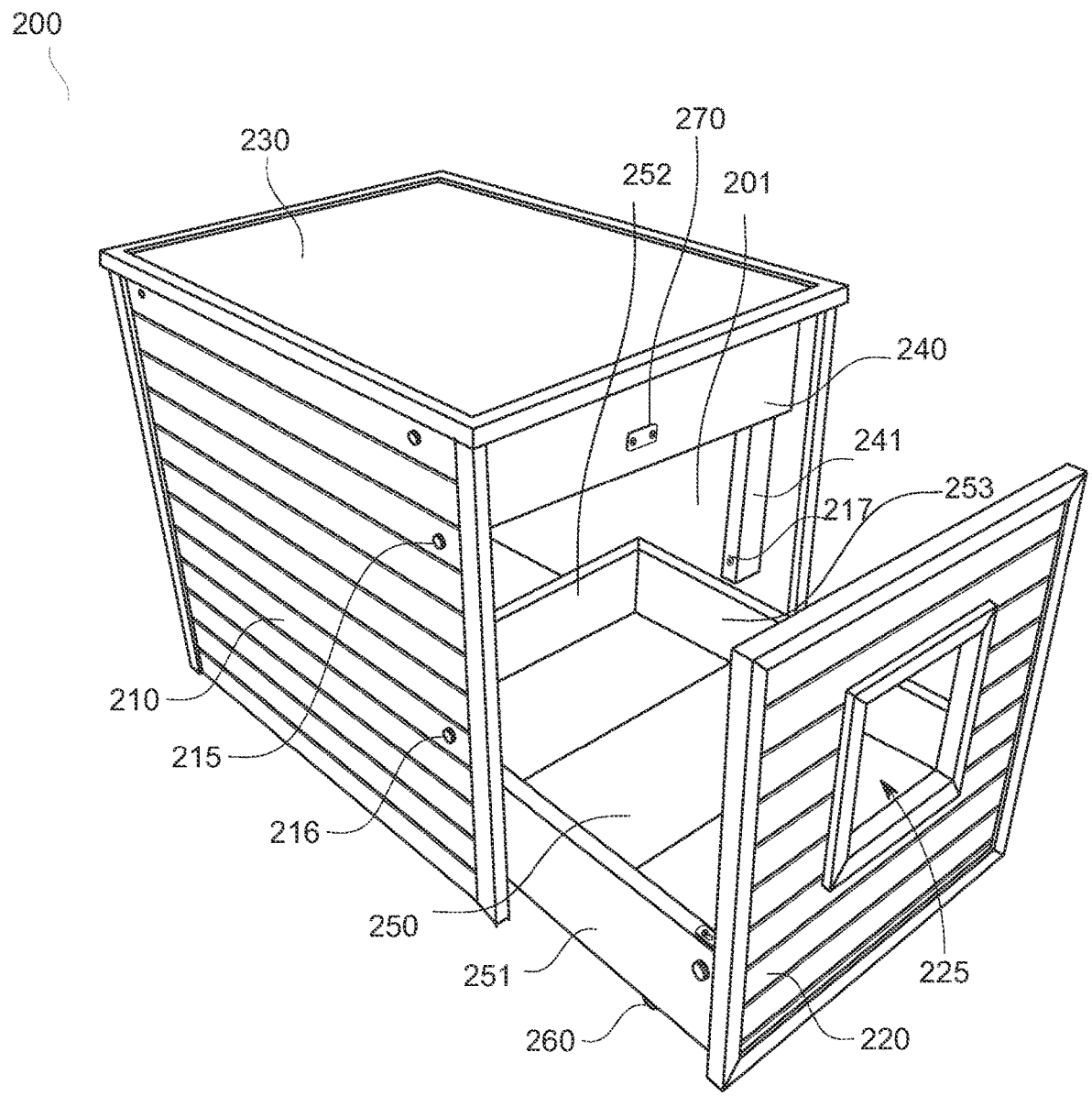
FIG. 2 is perspective view of one embodiment of the pet litter enclosure in a partially open position.

FIG. 2 is perspective view of one embodiment of the pet litter enclosure 200 in a partially open position.

Top panel 230 may form the top surface of the enclosure box. Right-side panel 201 may couple to top panel 230 and rear panel (not shown). Left-side panel 210 may couple to top panel 230 and rear panel (not shown).

Fastener 215 may attach left-side panel 210 to stop panel 240. A similar fastener (not shown) may attach right-side panel 201 to to stop panel 240. Fastener 217 may attach right-side panel to right-side stop panel support 241. Fastener 216 may attach left-side panel 210 to left-side stop panel support (not shown).

Magnet 270 may hold front panel 220 in place when the rolling internal compartment is in the closed position.

In operation, stop panel 240, right-side stop panel support 241 and left-side stop panel support (not shown) may set a maximum internal position of the rolling internal compartment. Stop panel 240 may prevent the rolling internal compartment from rolling too far into the enclosure box and beyond the maximum internal position of the rolling internal compartment.

The rolling internal compartment may include a front panel 220 and opening 225. Opening 225 is illustrated in FIG. 2 as a square opening, but this is not intended to be limiting. Opening 225 may be a rectangular shape, a circular shape, or another shape not specifically mentioned.

Opening 225 may provide a path for a pet to access the inside of the rolling internal compartment.

The rolling internal compartment may include a left-side panel 251, rear panel 252, right-side panel 253 and bottom panel 250. Left-side panel 251 may be coupled to front panel 220, rear panel 252 and bottom panel 250 using a fastener, adhesive or other method. Right-side panel 253 may be coupled to front panel 220, rear panel 252 and bottom panel 250 using a fastener, adhesive or other method. Bottom panel 250 may be coupled to front panel 220 and rear panel 252 using a fastener, adhesive or other method.

The rolling internal compartment may include wheel 260. Additional wheels may exist on the underside of bottom panel 250.

In operation, a litter box may be placed on bottom panel 250. A pet may enter the litter box enclosure through opening 225, make use of the litter box on bottom panel 250, and may exit the litter box enclosure through opening 225. In this manner, the litter box may be hidden from view.

In operation, an owner may roll the rolling internal compartment away from the box enclosure and may remove the litter box on bottom panel 250 and may dispose of the contents.

Figure 3:
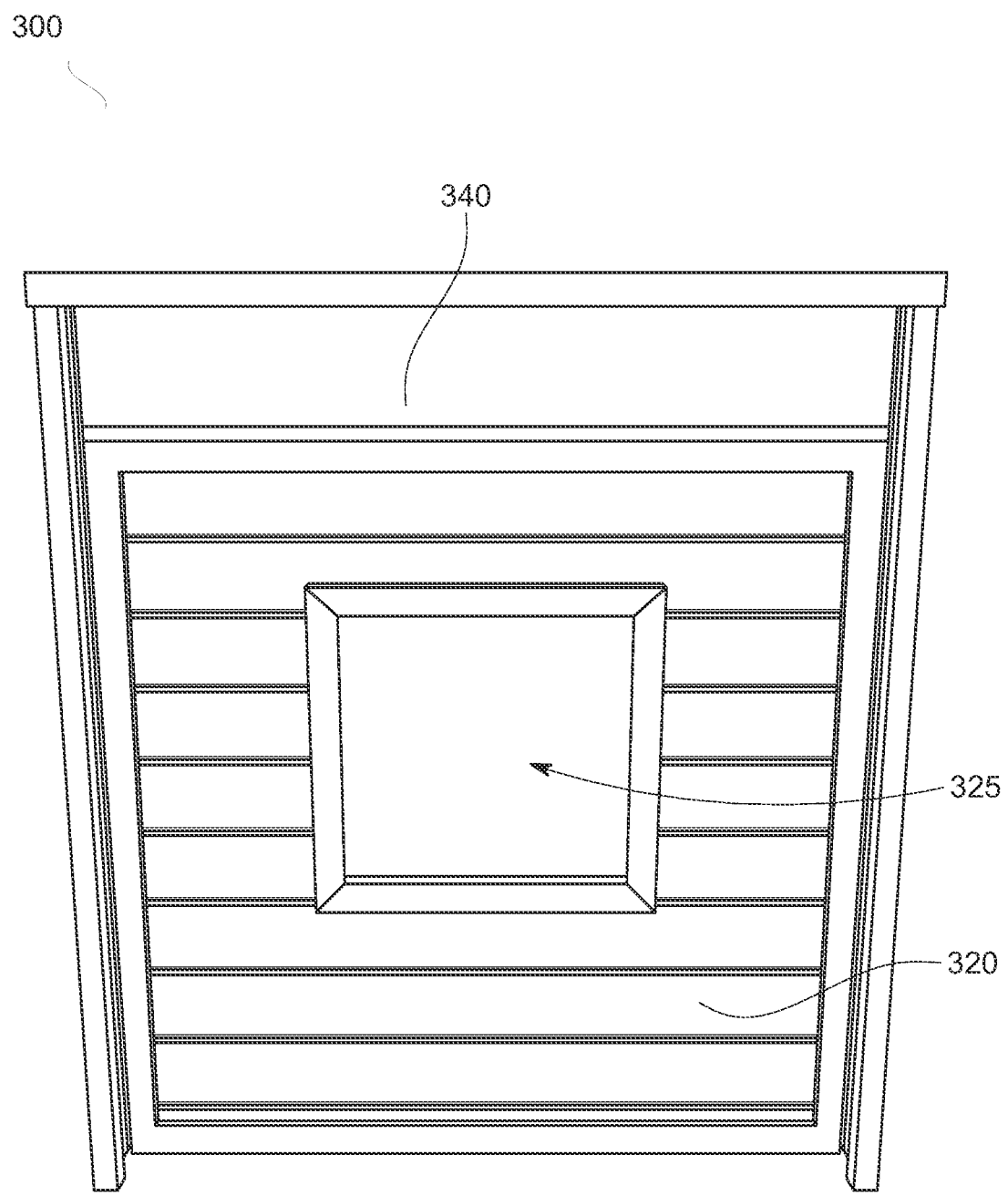
FIG. 3 is a front perspective view of one embodiment of the pet litter enclosure.

FIG. 3 is a front perspective view of one embodiment of the pet litter enclosure 300.

Front panel 320 may include opening 325. Opening 325 is illustrated in FIG. 3 as a square opening, but this is not intended to be limiting. Opening 325 may be a rectangular shape, a circular shape, or another shape not specifically mentioned.

Opening 325 may provide a path for a pet to access the inside of the rolling internal compartment.

Stop panel 340 may a maximum internal position of front panel 320 when in a closed position. In operation, a pet may enter the litter box enclosure through opening 325, make use of the litter box inside the litter box enclosure, and may exit the litter box enclosure through opening 325. In this manner, the litter box may be hidden from view.

Figure 4:
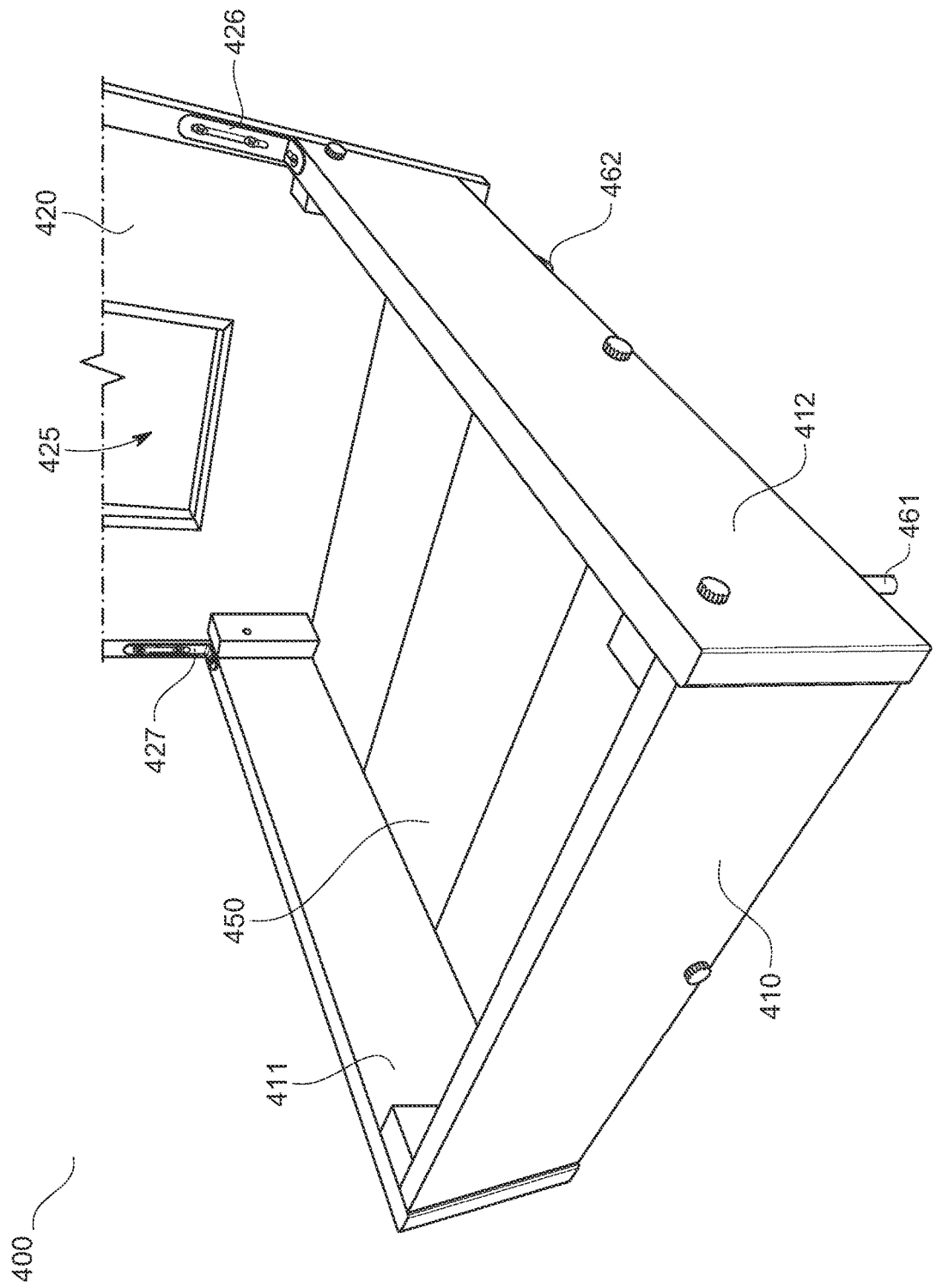
FIG. 4 is a perspective view of one embodiment of the rolling internal compartment

FIG. 4 is a perspective view of one embodiment of the rolling internal compartment 400.

Rolling internal compartment 400 may include a rear panel 410, a right-side panel 411, a left-side panel 412, a front panel 420 and bottom panel 450. Rear panel 410 may be coupled to right-side panel 411, left-side panel 412 and bottom panel 450. Front panel 420 may be coupled to right-side panel 411, left-side panel 412 and bottom panel 450.

Front panel 420 may be coupled to left-side panel 412 using bracket 426, but this is not intended to be limiting.

Front panel 420 may be coupled to left-side panel 412 using a different bracket, a fastener, adhesive or other method. Front panel 420 may be coupled to right-side panel 411 using bracket 427, but this is not intended to be limiting. Front panel 420 may be coupled to right-side panel 411 using a different bracket, a fastener, adhesive or other method.

Bottom panel 450 may be coupled to front panel 420, left-side panel 412, right-side panel 411 and rear panel 410. Panels may be coupled using an adhesive, a fastener or another method not specifically mentioned.

Front panel 420 may include opening 425. Opening 425 is illustrated in FIG. 4 as a square opening, but this is not intended to be limiting. Opening 425 may be a rectangular shape, a circular shape, or another shape not specifically mentioned.

Rolling internal compartment 400 may include wheel 462 and wheel 461. Additional wheels (not shown) may be included on the underside of rolling internal compartment 400.

In operation, a litter box may be placed on bottom panel 450.

Figure 5:
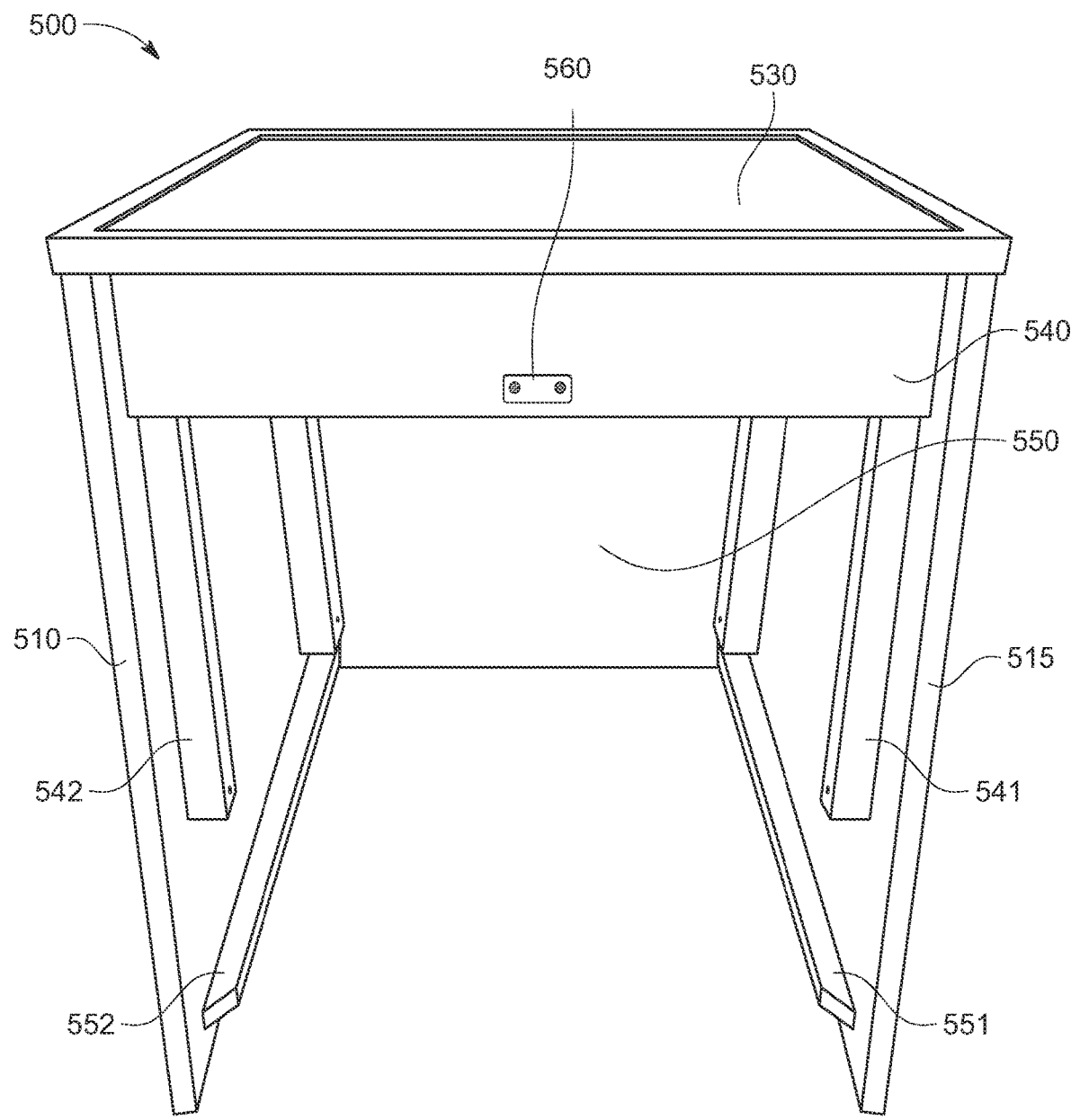
FIG. 5 is a front perspective view of one embodiment of the pet litter enclosure with the rolling internal compartment removed.

FIG. 5 is a front perspective view of one embodiment of the enclosure box 500 with the rolling internal compartment not shown.

Left-side panel 510 may be coupled to top panel 530 and rear panel 550. Left-side panel 510 may be coupled to top panel 530 and rear panel 550 using an adhesive, fastener or other method. Right-side panel 515 may be coupled to top panel 530 and rear panel 550. Right-side panel 515 may be coupled to top panel 530 and rear panel 550 using an adhesive, fastener or other method. Rear panel 550 may be coupled to top panel 530. Rear panel 550 may be coupled to top panel 530 using an adhesive, fastener or other method.

Stop panel 540 may be coupled to left-side panel 510 and right-side panel 515. Stop panel 540 may be coupled to left-side panel 510 and right-side panel 515 using an adhesive, fastener or other method. Right-side stop panel support 541 may be coupled to right-side panel 515. Right-side stop panel support 541 may be coupled to right-side panel 515 using an adhesive, fastener or other method. Left-side stop panel support 542 may be coupled to left-side panel 510. Left-side stop panel support 542 may be coupled to left-side panel 510 using an adhesive, fastener or other method.

Left-side rail 552 may be coupled to left-side panel 510. Right-side rail 551 may be coupled to right-side panel 515. Left-side rail 552 may be coupled to left-side panel 510 using an adhesive, fastener or other method. Right-side rail 551 may be coupled to right-side panel 515 using an adhesive, fastener or other method.

In operation, stop panel 540 may prevent the rolling internal compartment from rolling too far into enclosure box 500 and damaging enclosure box 500. Right-side rail 551 and left-side rail 552 may function as guides to direct the movement of the rolling internal compartment. Magnet 560 may hold the front panel of the rolling enclosure box in place when in a closed position.

The invention claimed is:
1. A pet litter enclosure comprising:
an enclosure box comprising:
a left-side panel, a rear panel, a right-side panel and a top panel;
the left-side panel coupled to the top panel and the rear panel:
the right-side panel coupled to the top panel and the rear panel:
a rolling internal compartment comprising:

a left-side panel, a right-side panel, a rear panel, a bottom panel, a front panel and a plurality of wheels coupled to one or more of the left-side panel, right-side panel, rear panel and front panel;

the left-side panel coupled to the bottom panel, the rear panel and the front panel:

the right-side panel coupled to the bottom panel, the rear panel and the front panel:

the bottom panel coupled to the rear panel and the front panel:

the front panel further comprising an opening, and the rolling internal compartment to roll and to fit inside the enclosure box.

2. The pet litter enclosure as claimed in claim 1, the enclosure box comprising a stop panel, the stop panel coupled to the left-side panel and the right-side panel, the stop panel to set the maximum internal position of the rolling internal compartment.

3. The pet litter enclosure as claimed in claim 2, the stop panel comprising a magnet.

4. The pet litter enclosure as claimed in claim 1, the bottom panel of the rolling internal compartment to support a removable litter box.

5. The pet litter enclosure as claimed in claim 1, the rolling internal compartment comprising 4 wheels coupled to the bottom panel, the wheels to respectively swivel 360 degrees.

6. The pet litter enclosure as claimed in claim 1, the opening comprising a square opening of at least 4 inches per side.

7. The pet litter enclosure as claimed in claim 1, the opening comprising a circular opening with a diameter of at least 6 inches.

8. The pet litter enclosure as claimed in claim 1, the left-side panel comprising a left-side rail to direct the movement of the rolling internal compartment inside the enclosure box.

9. The pet litter enclosure as claimed in claim 1, the right-side panel comprising a right-side rail to direct the movement of the rolling internal compartment inside the enclosure box.

* * * * *